United States Patent [19]

Rancon et al.

[11] Patent Number: 5,242,509
[45] Date of Patent: Sep. 7, 1993

[54] PROCESS OF THE PRODUCTION OF AN ATMOSPHERE FOR THE THERMAL TREATMENT OF METALS AND THERMAL TREATMENT APPARATUS

[75] Inventors: Yannick Rancon, Velizy; Eric Duchateau, Versailles; Philippe Queille, Viroflay, all of France

[73] Assignee: L'Air Liquide, Societe Anonyme pour l'Etude et l'Exploitation des Procedes Georges Claude, Paris, France

[21] Appl. No.: 778,403

[22] Filed: Oct. 17, 1991

[30] Foreign Application Priority Data

Oct. 26, 1990 [FR] France .............................. 90 13279

[51] Int. Cl.$^5$ ........................ C01B 21/04; C21D 1/76
[52] U.S. Cl. ..................................... 148/206; 148/231
[58] Field of Search ........................ 148/206, 230, 231

[56] References Cited

FOREIGN PATENT DOCUMENTS 0375477 6/1990 European Pat. Off. .
3630833 3/1988 Fed. Rep. of Germany ...... 148/206
671421 5/1952 United Kingdom .
2018299A 10/1979 United Kingdom .

OTHER PUBLICATIONS

"Commercial Nitrogen-The Basis for a Universal Controlled Atmosphere," Metal Science and Heat Treatment, vol. 20, Nos. 5/6, May 6, 1978, pp. 377-381.

*Primary Examiner*—Scott Kastler
*Attorney, Agent, or Firm*—Curtis, Morris & Safford

[57] ABSTRACT

The thermal treatment atmosphere is obtained by catalytic reaction of an impure mixture of nitrogen, advantageously obtained by permeation or adsorption, and hydrocarbon, the catalytic reaction being carried out at a temperature between 400° and 900° C., typically between 500° and 800° C., with a noble metal base catalyst, typically platinum or palladium on alumina support. The reaction may be carried out in a reactor placed inside or outside the furnace.

8 Claims, No Drawings

PROCESS OF THE PRODUCTION OF AN ATMOSPHERE FOR THE THERMAL TREATMENT OF METALS AND THERMAL TREATMENT APPARATUS

BACKGROUND OF THE INVENTION (a) Field of the Invention

The present invention concerns processes for the production of an atmosphere for the thermal treatment of metals and, more particularly, "of protection" atmosphere, such as used during annealing, tempering, heating before hardening, decarburizing annealing, brazing or sintering, comprising mainly nitrogen and controlled amounts of reducing, or carburizing and oxidizing, or decarburizing species.

(b) Description of Prior Art

In this type of thermal treatments, it is necessary to protect metallic parts against oxidation and, eventually, against decarburization by utilizing the protective atmosphere which is present in the furnace.

These protective atmospheres are frequently obtained from an exothermic generator to ensure an incomplete combustion of a hydrocarbon with air. Generally, the exothermic gas should be purified in order to limit the level of $CO_2$ and reduce the dew point. The thermal treatment atmosphere may originate from an endothermic generator where a mixture of air and hydrocarbon is sent over a catalytic bed at a temperature higher than 1000° C. In order to prevent a high proportion of carburizing species, the endothermic gas is diluted with pure nitrogen produced by cryogenic means.

It has also been proposed to produce thermal treatment atmospheres by reaction of a mixture of hydrocarbons and impure nitrogen having a residual content of oxygen higher than 0.5% at a temperature higher than 950° C., with a nickel base catalyst. This process has the disadvantages of a significant energy cost by reason of the temperature required for the catalytic reaction and the formation of soots for which nickel is a promoter.

SUMMARY OF INVENTION

It is an object of the present invention to propose a process of the preceding type which can be carried out in a large scale of thermal treatments of metals, for example at temperatures lower than 800° C., with reduced production costs, while offering a large flexibility of use and preventing the formation of soots.

For this purpose, according to a characteristic of the invention, the reaction between impure nitrogen and the hydrocarbon is carried out at a temperature between 400° and 900° C., typically between 500° and 800° C. with a noble metal base catalyst, typically platinum or palladium on a support of alumina.

It is another object of the present invention to provide an apparatus for the thermal treatment of metals, of the type comprising a furnace, a source of impure nitrogen having a residual content of oxygen higher than 0.5%, a source of hydrocarbon and a catalytic reactor, characterized in that the reactor contains a noble metal base catalyst.

According to an advantageous characteristic of the invention, impure nitrogen is obtained by the technique of air separation in situ through permeation or adsorption.

According to the invention, the catalytic reaction between the oxygen which is initially present in nitrogen and hydrocarbon leads mainly to the formation of the reducing species which are required for the protection, namely hydrogen and carbon monoxide. Water vapor and carbon dioxide are also formed, but in lesser quantity. If the reducing species/oxidizing species ratio is sufficiently high, the generated atmosphere protects the metal against oxidation. This ratio is directly dependent on oxygen and hydrocarbon contents in the initial mixture, which contents may easily be adjusted. In practice, the quantities of hydrogen and carbon monoxide obtained by catalytic reaction at a temperature between 400° and 900° C. over a noble metal are comparable to those produced by exothermic generators and are therefore perfectly suitable for protection thermal treatments. The quantities of reducing species are between 2 and 30% of the atmosphere. In order that the reducing species resulting from the catalytic reaction represent 10 to 30% of the treatment atmosphere, the oxygen content in impure nitrogen should be relatively high, between 1 and 7%, typically between 3 and 7%, which requires that this low purity nitrogen be obtained by air separation through permeation or adsorption and thus enables the process according to the invention to be quite competitive with exothermic generators.

In the process according to the invention, the use of a noble metal base catalyst enables a higher selectivity towards the products obtained (mainly reductive species) and a higher reaction kinetic, which enables to conduct the reaction at relatively low temperatures, such as already at 400°-500° C. and enables to carry the reaction in a reactor ex situ, outside the furnace, which permits a higher flexibility of use for a large scale of furnaces and types of thermal treatments. The reaction may obviously be carried out in known manner, directly in the furnace.

EXAMPLES OF APPLICATION FOR THE WORKING OF THE INVENTION:

EXAMPLE 1 bright and non decarburizing annealing of coils of steel thread in a pushing furnace at 700° C.

The reactor containing the catalyst is placed outside the annealing furnace and maintained at a temperature of 660° C. The catalyst contains here 0.5% (by weight) of platinum on a support of alumina.

A mixture of hydrocarbon (in the present case natural gas, at 5.5% by volume) and nitrogen produced by permeation (94.5% by volume) is sent into the reactor. The oxygen content in the nitrogen produced by permeation is 3%.

The atmosphere produced in the reactor contains 15% of reducing species $H_2+CO$, with a dew point of $-17°$ C.

The annealed steel thread under these conditions comes out bright and non decarburizing.

This atmosphere may advantageously replace the purified rich exothermic gas which is normally used.

EXAMPLE 2 bright annealing of steel tubes with low carbon content in continuous roller furnace at 900° C.

The catalyst, identical to that of the previous example, is disposed in a reactor placed outside the annealing furnace and maintained at a temperature of 640° C.

A mixture of hydrocarbon (natural gas, 8.5% by volume) and nitrogen produced by permeation (91.5% by volume) is sent to the reactor. The oxygen content in permeation nitrogen is 5%.

The atmosphere produced by the reactor contains 20% reducing species $H_2+CO$.

The annealed steel tube under these conditions comes out with a bright surface state.

This atmosphere may advantageously replace the rich exothermic gas normally used.

EXAMPLE 3 annealing of coils of steel sheets in a bell furnace at 700° C.

The reactor containing the catalyst is placed outside the furnace, which enables to feed a plurality of bell furnaces in parallel, and is maintained at a temperature of 500° C. The catalyst contains here 0.5% (by weight) of palladium on a support of alumina.

A mixture of hydrocarbon (natural gas, 2% by volume) and nitrogen produced by adsorption (98% by volume) is sent into the reactor. The oxygen content in the adsorption nitrogen is 1%.

The atmosphere produced contains 4 to 5% of $H_2+CO$, which is compatible with safety requirements for this type of furnace (mixture not combustible in air). The proportion of $H_2O+CO_2$ is sufficiently low to ensure the protection of the sheet during annealing.

This atmosphere may advantageously replace the purified poor exothermic gas which is presently used.

EXAMPLE 4 decarburizing annealing of magnetic sheets in a continuous pushing furnace at 800° C.

The reactor containing the catalyst is placed inside the furnace, in a hot zone thereof. It therefore operates at a temperature near that of the furnace (800° C.). The catalyst used contains here 0.5% (by weight) of platinum on a support of alumina.

A mixture of hydrocarbon (natural gas, 10% by volume) and nitrogen produced by permeation (90% by volume) is sent into the reactor. The oxygen content in the permeation nitrogen is 7%.

The atmosphere produced corresponds to the composition of a non purified rich exothermic atmosphere: 20% reducing species and a dew point of about +20° C. so as to decarburize the sheet.

We claim:

1. Process for the preparation of an atmosphere for thermal treatment comprising mainly nitrogen and controlled amounts of reducing, or carburizing and oxidizing, or decarburizing species, by catalytic reaction of a mixture of hydrocarbon and impure nitrogen having a residual content of oxygen higher than 0.5%, wherein the reaction is carried at a temperature between 400° and 900° C. with a noble metal base catalyst.

2. Process according to claim 1, wherein the reaction temperature is a range between 500° and 800° C.

3. Process according to claim 1, wherein the impure nitrogen contains between 2 and 7% oxygen.

4. Process according to claim 1, wherein the mixture contains a major proportion of impure nitrogen.

5. Process according to claim 4, wherein the proportion of impure nitrogen is at least 90%.

6. Process according to claim 1, wherein the amount of resulting reducing species is between 10% and 30% of the treatment atmosphere.

7. Process according to claim 1, wherein the noble metal consists of platinum or palladium.

8. Process according to claim 1, wherein impure nitrogen is obtained by permeation or adsorption.

* * * * *